United States Patent Office 3,262,937
Patented July 26, 1966

3,262,937
BENZYL PIPERIDYL KETONES
Marcel Pesson, Paris, France, assignor to Societe Anonyme dite: Laboratoire Roger Bellon, Neuilly-sur-Seine, France, a company of France
No Drawing. Filed Jan. 11, 1963, Ser. No. 250,766
Claims priority, application Great Britain, Jan. 17, 1962, 1,747/62
6 Claims. (Cl. 260—294.7)

This invention relates to benzyl piperidyl ketones, processes for their preparation and pharmaceutical compositions containing them.

The present invention relates particularly to benzyl piperidyl ketones of Formula I:

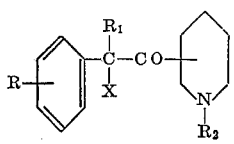

and their acid addition salts and quaternary ammonium salts, wherein R represents hydrogen or halogen or alkyl or an alkoxy group, $R_1$ represents hydrogen or alkyl, $R_2$ represents alkyl and X represents hydrogen or the cyano group. The more valuable compounds are those in which R is in the para-position and represents a hydrogen or chlorine or lower alkyl or a lower alkoxy group, $R_1$ represents hydrogen or lower alkyl, for instance, methyl, $R_2$ represents lower alkyl, and X represents hydrogen or the cyano group.

The compounds of Formula I in which X is the cyano group have interesting pharmacodynamic properties. They are, for instance, valuable agents for depressing the activity of the central nervous system and/or respiratory analeptics. Thus, α-phenyl-α-N-ethyl isonipecotoyl acetonitrile, which has an $LD_{50}$ in the mouse, when administered intravenously, of 350 mg./kg., has a marked respiratory analeptic activity in a dose as low as one twentieth of the $LD_{50}$ in mice and this activity is especially strong and prolonged with a dose of twice this amount. This compound has also a central nervous system depressing activity shown by a potentiation of the hypnosis caused by administration of hexobarbital and by an analgesic effect. The compounds in which X is hydrogen also have interesting pharmacodynamic activity. They are, for instance, spasmolytics or analeptics; thus benzyl N-methyl-3-piperidyl ketone, benzyl N-methyl-4-piperidyl ketone, and 4-chloro benzyl N-methyl-4-piperidyl ketone are spasmolytically active agents while benzyl N-ethyl-4-piperidyl ketone is an analeptic agent. This last mentioned compound, which has an $LD_{50}$ of 30 mg./kg. in the mouse, when administered intravenously, possesses a remarkable respiratory analeptic activity and a strong analgesic effect. It also has a highly remarkable peripheral vasodilatory activity. The compounds of Formula I are also useful as intermediates in the production of other pharmacodynamically active compounds.

According to a another embodiment of the present invention, the compounds of Formula I in which $R_1$ represents hydrogen and X represents the cyano group are prepared by condensation, in the presence of a basic catalyst, of a benzyl cyanide of Formula II:

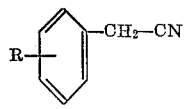

with an ester of a piperidyl carboxylic acid of Formula III:

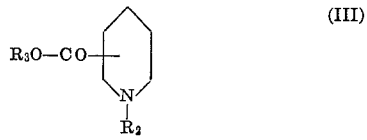

where $R_3$ is lower alkyl and R and $R_2$ are members as hereinbefore defined.

According to one method of carrying out this process, the condensation is carried out at elevated temperature in solution in a lower alkanol, such as ethanol, the condensing agent being a sodium alkoxide prepared in situ by dissolving of sodium metal in the alcohol, and the cyanide, ester, and alkoxide being in substantially equimolecular proportions.

In this method, the alkoxide solution is vigorously stirred and the cyanide is rapidly introduced. The solution is then boiled under reflux, and the ester is added dropwise. The mixture is thereafter heated under reflux for at least one hour, the solvent is distilled off, preferably in vacuo, and the residue is taken up in water, in which the sodium derivative of the β-keto nitrile dissolves. After extracting unreacted cyanide and ester, the product is acidified with exactly the stoichiometric quantity of an acid, preferably a weak acid such as acetic acid, and the keto nitrile is recovered, washed, and if desired, recrystallized.

With this method, however, only moderate yields are obtained and a second method has been developed for the preparation of β-keto nitriles by which it is possible to obtain yields of 70–80%.

According to this second method, an alkali metal derivative of the benzyl cyanide of Formula II is condensed with a piperidyl carboxylic acid ester of Formula III in a non-polar medium.

In this preferred method, the cyanide is mixed with an alkali metal amide in a non-polar solvent such as benzene, toluene, or xylene. The ester is thereafter added, while stirring, and the mixture is boiled under reflux for at least one hour. Excess amide is then destroyed, if required, by the addition of alcohol, and the sodium derivative of the β-keto nitrile is extracted with water. The keto nitrile is then isolated as described above.

According to a further embodiment of the present invention compounds of Formula I in which $R_1$ represents alkyl and X represents the cyano group are prepared by alkylation of a compound of Formula I in which $R_1$ represents hydrogen and X represents the cyano group. This alkylation is, in general, most easily carried out by treating the latter compound with the alkyl ester of a strong acid in the presence of an acid-binding agent, e.g. with methyl sulfate in the presence of an alkali metal hydroxide such as sodium hydroxide.

According to still another embodiment of the present invention compounds of Formula I in which X represents hydrogen are prepared by heating a compound of Formula I in which X represents the cyano group in an acid medium. This treatment causes hydrolysis with simultaneous decarboxylation as the first formed β-keto acid undergoes spontaneous decarboxylation.

It is the preferred procedure to carry out the hydrolysis with a mixture of sulfuric acid, acetic acid and water in the ratio 2:2:1, by volume, using about two moles of water for each mole of nitrile. As soon as the hydrolysis is completed the solvent is removed in vacuo and the residue is taken up in water. The solution is made alkaline and the ketone separates as an oil or solid which is recovered by conventional procedures.

The invention includes within its scope pharmaceutical compositions comprising one or more of the compounds of Formula I or a nontoxic acid addition salt thereof in association with a pharmaceutical carrier. Such compositions may be in a form suitable for oral administration, for instance, as a tablet, or for parenteral administration, for instance, as a sterile, injectable, aqueous solution.

The following examples serve to illustrate the present invention without, however, limiting the same thereto.

EXAMPLE I

α-(4-ethoxy phenyl)-α-N-methyl isonipecotoyl acetonitrile

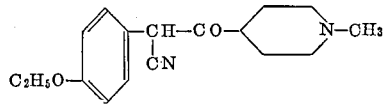

To a solution of sodium ethoxide, prepared from sodium metal (3 g.) and absolute alcohol (60 cc.), a solution of p-ethoxy benzyl cyanide (16 g.) and ethyl N-methyl isonipecotate (25.4 g., 50% excess) in absolute alcohol (40 cc.) is added. After the mixture has been heated under reflux for 7 hours, the solvent is evaporated, the residue is taken up in 150 cc. of water, an oily insoluble fraction is extracted with ether, and the aqueous solution is acidified by the addition of acetic acid. The resulting precipitate is filtered off, washed with water, and dried. 8.5 g. (29.7% yield) of a product are obtained which, when purified by recrystallization from alcohol, melts at 239° C.

Analysis ($C_{17}H_{22}N_2O_2$) (M.W=286.36): Calculated percent: C=71.30; H=7.74; N=9.78. Found percent: C=71.30; H=7.94; N=9.90.

The hydrochloride of the product melts at 142–144° C. with decomposition.

EXAMPLE II

α-Phenyl-α-N-ethyl isonipecotoyl acetonitrile

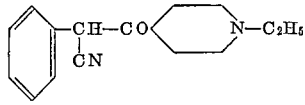

To a suspension of sodium amide, prepared from 2.3 g. of sodium metal and 200 cc. of liquid ammonia in the presence of a small quantity of ferric nitrate, there is added a solution of 11.7 g. of benzyl cyanide in 50 cc. of toluene. When the excess of ammonia has been driven off, 20.3 g. of ethyl N-ethyl isonipecotate are added and the mixture is heated at 80° C. for 3 hours. After cooling, the product is treated with 50 cc. of alcohol and then with 400 cc. of water. The aqueous solution is separated by decantation, extracted with ether and neutralized by the addition of 6 cc. of acetic acid. The resulting precipitate is filtered off, washed with water, and dried. There are obtained 21.1 g. in a yield of 78.5%.

This keto nitrile, which is sparingly soluble in most of the organic solvents, is purified by recrystallization from dimethyl formamide. Its melting point is 274° C.

Analysis ($C_{16}H_{20}N_2O$) (M.W.=256.34): Calculated percent: C=74.96; H=7.86; N=10.93. Found percent: C=75.00; H=8.04; N=11.22.

The hydrochloride melts at 194° C.

EXAMPLE III

α-Phenyl-α-N-methyl pipecoloyl acetonitrile

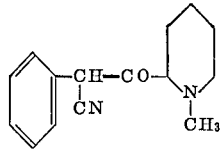

Its preparation is carried out as in Example II, but using 18.8 g. of ethyl N-methyl pipecolate, in place of 20.3 g. of ethyl N-ethyl isonipecotate.

Analysis ($C_{15}H_{18}N_2O$) (M.W.=242.31): Calculated percent: C=74.35; H=7.49; N=11.56. Found percent: C=74.78; H=7.66; N=11.44.

EXAMPLE IV

α-Phenyl-α-N-methyl nipecotoyl acetonitrile

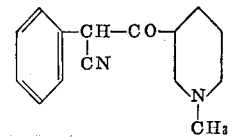

This compound is prepared as described in Example II from benzyl cyanide and ethyl N-methyl nipecotate in a yield of 71%. It is purified by recrystallization from dimethyl formamide and melts at 255° C. Its hydrochloride melts at 161° C. with decomposition.

Analysis ($C_{15}H_{18}N_2O$) (M.W.=242.31): Calculated percent: C=74.35; H=7.49; N=11.56. Found percent: C=73.81; H=7.77; N=11.66.

EXAMPLE V

α-(4-chloro phenyl)-N-methyl nipecotoyl acetonitrile

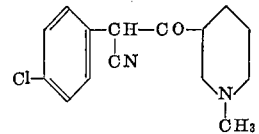

This compound is prepared as described in Example II from p-chloro benzyl cyanide and ethyl N-methyl nipecotate in a yield of 48.7%. It is purified by recrystallization from dimethyl formamide and melts at 256° C.

Analysis ($C_{15}H_{17}ClN_2O$) (M.W.=276.50): Calculated percent: C=65.09; H=6.14; N=10.12. Found percent: C=65.07; H=6.70; N=10.15.

EXAMPLE VI

α-(4-chloro phenyl)-α-N-methyl isonipecotoyl acetonitrile

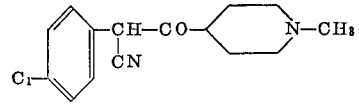

This compound is obtained according to the method of Example II in a yield of 89%. After purification by recrystallization from dimethyl formamide, its melting point is 306–307° C.

Analysis ($C_{15}H_{17}ClN_2O$) (M.W.=276.50): Calculated percent: C=65.09; H=6.14; N=10.12. Found percent: C=65.38; H=6.19; N=10.26.

EXAMPLE VII

α-(4-chloro phenyl)-α-N-ethyl isonipecotoyl acetonitrile

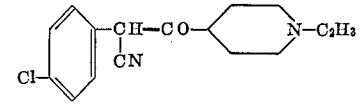

This compound is obtained in a yield of 40% by proceeding according to Example II from p-chloro benzyl cyanide and ethyl N-ethyl isonipecotate. After purification by recrystallization from dimethyl formamide, its melting point is 292° C.

Analysis ($C_{16}H_{19}ClN_2O$) (M.W.=290.50): Calculated percent: C=66.08; H=6.67; N=9.63. Found percent: C=66.17; H=6.54; N=9.32.

EXAMPLE VIII

α-Phenyl-α-N-butyl nipecotoyl acetonitrile

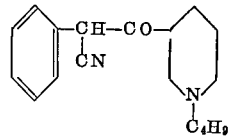

This compound is obtained in a yield of 73.4%, using the method of Example II, from benzyl cyanide and ethyl N-butyl nipecotate. After purification by recrystallization from a mixture of dimethyl formamide and alcohol, its melting point is 197° C.

Analysis ($C_{18}H_{24}N_2O$) (M.W.=284.39): Calculated percent: C=76.02; H=8.51; N=9.85. Found percent: C=76.08; H=8.32; N=10.15.

EXAMPLE IX

α-Phenyl-α-methyl-α-N-methyl nipecotoyl acetonitrile

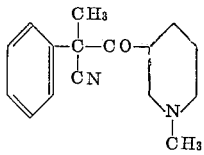

6 g. of the product of Example IV are dissolved in 60 cc. obtained according to 2 N sodium hydroxide solution and, while the solution is vigorously stirred, 9 cc. of neutral methyl sulfate are added thereto drop by drop. The reaction product precipitates. After stirring for one more hour at room temperature, the formed precipitate is filtered off, washed and dried. 4.2 g. of a product are obtained corresponding to a yield of 64%. After purification by recrystallization from ethanol, its melting point is 277° C.

Analysis ($C_{16}H_{20}N_2O$) (M.W.=256.34): Calculated: percent: C=74.95; H=7.86; N=10.93. Found percent: C=75.37; H=8.10; N=11.18.

Its hydrochloride melts at 238° C.

EXAMPLE X

α-Phenyl-α-N-methyl isonipecotoyl acetonitrile

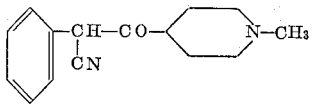

This keto nitrile is prepared in accordance with the method of Example II from 47.2 g. of benzyl cyanide and 74.8 g. of ethyl N-methyl isonipecotate. It is obtained in a yield of 69%. After purification by recrystallization from dimethyl formamide, its melting point is 279–280° C.

Analysis ($C_{15}H_{18}N_2O$) (M.W.=262.3): Calculated percent: C=74.35; H=7.49; N=11.56. Found percent: C=74.26; H=7.94; N=11.52.

EXAMPLE XI

Benzyl N-methyl-3-piperidyl ketone

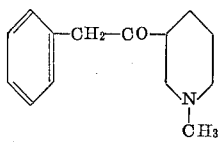

24.2 g. of the keto nitrile of Example IV are suspended in a mixture of 50 cc. of acetic acid, 50 cc. of sulfuric acid and 25 cc. of water. The mixture is heated under reflux for 12 hours and the greater part of the acetic acid is distilled off in vacuo on the water bath. The viscous residue is poured onto ice, the resulting solution is made alkaline by the addition of ammonia, and the formed oil is extracted with ether. After washing and drying with anhydrous sodium sulfate, the solvent is driven off and the residue is subjected to fractional distillation in vacuo. 16.1 g. of an oil are obtained (yield: 74.1%), its boiling point is 135–140° C. 0.9 mm. Hg. Its molecular weight, determined by perchloric acid titration in acetic acid, is 217 (calculated for $C_{14}H_{19}NO$=217.3).

This ketone gives a citrate which melts at 253° C. after recrystallization from alcohol.

Analysis ($C_{20}H_{27}NO_8$) (M.W.=409.42): Calculated percent: C=58.67; H=6.65; N=3.42. Found percent: C=58.80; H=6.48; N=3.35.

EXAMPLE XII 4-chloro benzyl N-methyl-3-piperidyl ketone

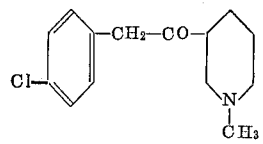

As in the preceding example, 38 g. of the keto nitrile of Example V are hydrolyzed by boiling in a mixture of 70 cc. of acetic acid, 70 cc. of sulfuric acid and 35 cc. of water for 3 hours. The amino ketone is isolated as described hereinbefore as a solid, which melts at 71° C. after recrystallization from cyclohexane. 33.5 g. of the product were obtained, yield: 98%.

Analysis ($C_{14}H_{18}ClNO$) (M.W.=251.50): Calculated, percent: C=66.79; H=7.15; N=5.56. Found, percent: C=66.83; H=7.71; N=5.50.

EXAMPLE XIII 4-chloro benzyl N-ethyl-4-piperidyl ketone

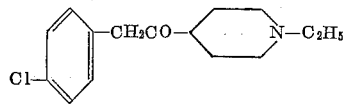

This ketone is obtained in a yield of 98% in the same way as described in the preceding example from the keto nitrile of Example VII. It melts at 79° C. after recrystallization from cyclohexane.

Analysis ($C_{15}H_{20}ClNO$) (M.W.=265.50): Calculated, percent: C=67.79; H=7.59; N=5.25. Found, percent: C=68.00; H=7.53; N=5.27.

EXAMPLE XIV

Benzyl N-ethyl-4-piperidyl ketone

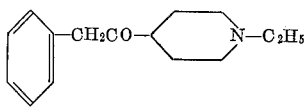

This compound is obtained in a yield of 69% from the keto nitrile of Example II, using the method of Example XII. An oil is obtained, the boiling point of which is 136–137° C./0.8 mm. Hg. Its molecular weight, on perchloric acid titration, is 229.9 (calculated for $C_{15}H_{21}NO$=231.3). Its hydrochloride melts at 174° C.

Analysis ($C_{15}H_{21}NO.HCl$) (M.W.=267.80): Calculated, percent: C=67.28; H=8.22; N=5.23. Found, percent: C=67.41; H=7.70; N=5.19.

EXAMPLE XV

α-Phenyl ethyl N-methyl-3-piperidyl ketone

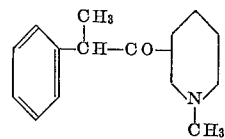

33 g. of the keto nitrile of Example IX are hydrolyzed by heating it with a mixture of 82 cc. of acetic acid, 82 cc. of sulfuric acid and 41 cc. of water for 3 hours. The formed ketone is unstable and cannot be distilled. It is converted into the citrate which is purified by recrystallization from a mixture of methanol and ether. It melts at 228° C.

Analysis ($C_{15}H_{21}NOC_6H_8O_7$) (M.W.=423.4): Calculated, percent: C=59.56; H=6.90; N=3.31. Found, percent: C=59.16; H=7.33; N=3.40.

EXAMPLE XVI

*Benzyl N-butyl-3-piperidyl ketone*

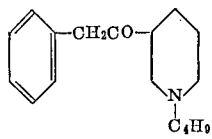

This ketone is obtained by hydrolysis of the keto nitrile of Example VIII, using the method of Example XII. It is an oil having a boiling point of 152–155° C./0.8 mm. Hg and a molecular weight of 262 (calculated for $C_{17}H_{25}NO=259.4$). It yields an oxalate which melts at 177° C.

Analysis ($C_{17}H_{25}NOC_2O_4H_2$) (M.W.=349.38): Calculated, percent: C=65.31; H=7.79; N=4.01. Found, percent: C=65.35; H=7.59; N=4.01.

EXAMPLE XVII

*Benzyl N-methyl-4-piperidyl ketone*

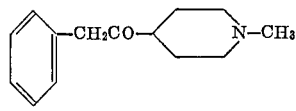

This compound is prepared by hydrolysis of the keto nitrile of Example X, using the method of Example XII. It is an oil having a boiling point of 140–142° C./0.8 mm. Hg and a molecular weight of 218 (calculated for $C_{14}H_{19}NO=217.3$). Its hydrochloride, after recrystallization from alcohol, melts at 178° C.

Analysis ($C_{14}H_{19}NO.HCl$) (M.W.=253.80): Calculated, percent: C=66.19; H=7.88; N=5.51. Found, percent: C=66.50; H=7.62; N=5.33.

I claim:

1. A benzyl piperidyl ketone compound selected from the group consisting of a benzyl piperidyl ketone of the formula

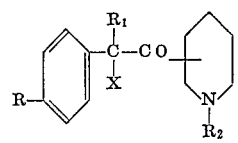

wherein

X represents a member selected from the group consisting of hydrogen and cyano;

R represents a member selected from the group consisting of hydrogen, halogen, lower alkyl, and lower alkoxy;

$R_1$ represents a member selected from the group consisting of hydrogen and lower alkyl; and $R_2$ represents a member selected from the group consisting of lower alkyl;

and its pharmaceutically acceptable, substantially non-toxic acid addition salts.

2. α-Phenyl-α-N-ethyl isonipecotoyl acetonitrile and its pharmaceutically acceptable acid addition salts.

3. Benzyl N-methyl-3-piperidyl ketone and its pharmaceutically acceptable acid addition salts.

4. Benzyl N-methyl-4-piperidyl ketone and its pharmaceutically acceptable acid addition salts.

5. 4-chloro benzyl-N-methyl-4-piperidyl ketone and its pharmaceutically acceptable acid addition salts.

6. Benzyl-N-ethyl-4-piperidyl ketone and its pharmaceutically acceptable acid addition salts.

References Cited by the Examiner

UNITED STATES PATENTS 2,546,159  3/1951  Kaegi et al. _____ 260—294.7 X
2,771,391  11/1956  Rockstahler _____ 260—294.7

OTHER REFERENCES

Pesson et al.: Comptes Rendus 255, pp. 956–958 (62).
Russell et al.: Jour. Am. Chem. Soc., vol. 74, pages 1310–13 (1952).
Villani et al.: J. Org. Chem. 17, pp. 249–254 (52) (page 252 relied upon).

WALTER A. MODANCE, *Primary Examiner.*

NICHOLAS S. RIZZO, JOHN D. RANDOLPH,
*Examiners.*

ROBERT L. PRICE, A. D. SPEVACK,
*Assistant Examiners.*